Figure 1:
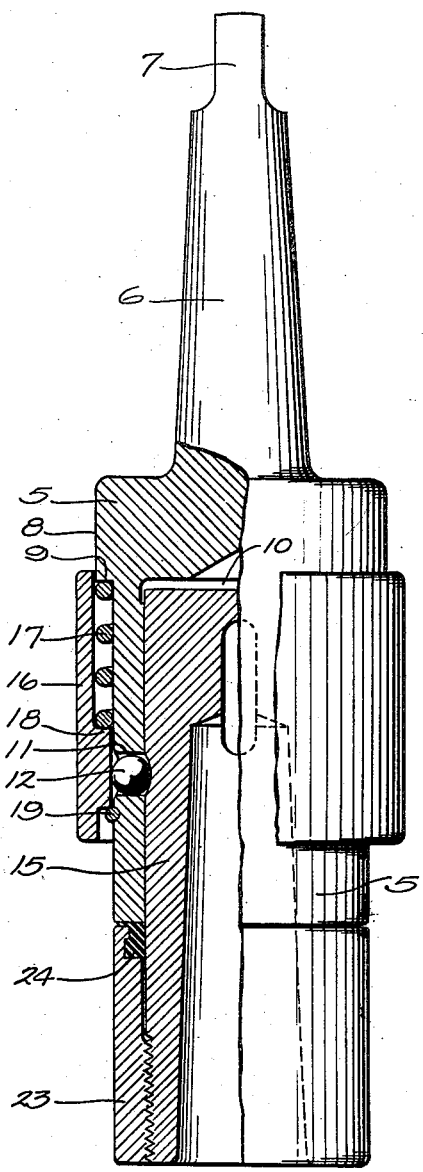

May 20, 1952 E. PODJASKI 2,597,816

TOOLHOLDING CHUCK

Filed Dec. 10, 1948

Inventor
EDWARD PODJASKI

By Miles Henninger
Attorney

Patented May 20, 1952

2,597,816

UNITED STATES PATENT OFFICE 2,597,816

TOOLHOLDING CHUCK

Edward Podjaski, Milwaukee, Wis., assignor to The Falk Corporation, Milwaukee, Wis., a corporation of Wisconsin Application December 10, 1948, Serial No. 64,597

6 Claims. (Cl. 279—75)

This invention relates to improvements in tool-holding chucks of the so-called "quick-change" type.

In the forms of "quick-change" chucks or tool holders now commonly in use, the tool is not held sufficiently rigidly for easy alinement with marks on the piece to be worked and to perform some of the common metal working operations. Accordingly, such chucks must frequently be replaced by a solid sleeve type of tool holder, which replacement is time-consuming, and requires the stocking both of a large number of collet and solid sleeve type tool holders.

It is, therefore, one object of the present invention to provide a toll-holding chuck of the "quick-change" type, which is capable of holding a tool rigidly without impairing the "quick-changeability" of the chuck.

Another object of the invention is to provide a tool-holding collet and chuck combination with means for taking up looseness or "play" in the chuck parts to such degree as to make the chuck more easily usable and usable for various operations not heretofore performable with such chucks.

Another object of the invention is to so modify a chuck and collet tool-holder in which the collet is easily removed and replaced, as to make the tool more easily alignable and capable of performing a greater variety of operations than heretofore possible by the use of such chuck combination, and without impairment of the ready removability and replaceability of the collet in the chuck body.

Figure 2:
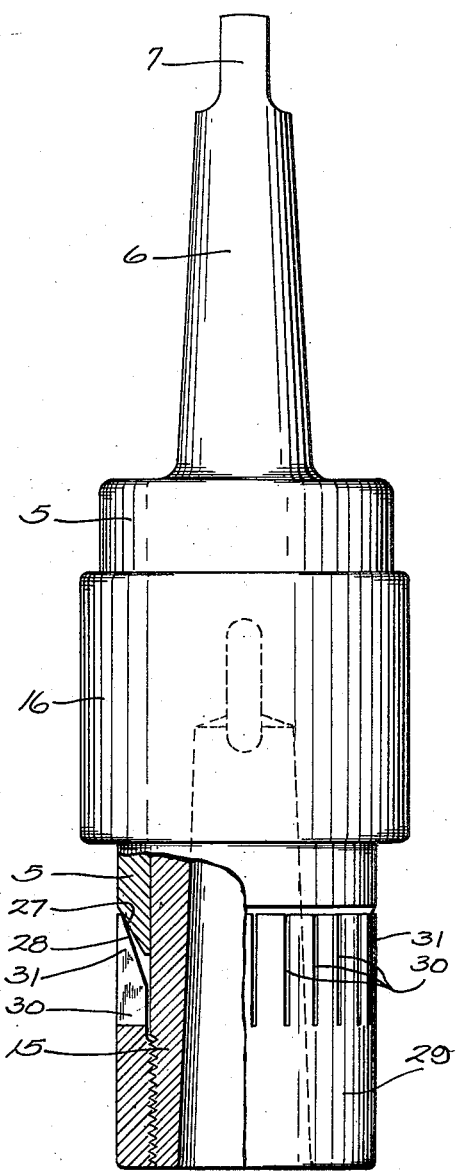

Other objects and advantages will appear from the following description when read in connection with the drawing in which:

Fig. 1 shows one embodiment of the present invention with a chuck and a collet in assembled relation, the structure being shown partially in section and partially in elevation, and Fig. 2 is a view partially in elevation and partially in section, of a second embodiment of the present invention.

In the following description like numerals designate like parts and numeral 5 generally designates the body of the chuck having a tapered shank 6 with a tang 7 at one end thereof, for engagement with correspondingly shaped portions of a machine tool. The chuck body has an enlarged portion 8 formed to provide a shoulder 9 facing the free end of the body which is socketed as shown at 10.

The chuck body 5 is provided with a plurality of apertures 11 to receive balls 12 for engagement severally in pockets connected by a groove in a collet 15, upon insertion of the collet into the socket 10 in the chuck body. The balls are retained in the apertures by a substantially cylindrical collar 16 extending about a portion of the chuck body and movable axially thereof. Movement of the collar is limited in one direction by a helical spring 17 acting between the chuck body shoulder 9 and one side of an inwardly extending enlargement 18 of the sleeve, and movement of such collar in the other direction is limited by a snap ring 19 engageable with the other side of the collar enlargement 18.

When the collet 15 is to be removed from the chuck body, the collar 16 is moved in the direction to compress spring 17 and thus releases balls 12 from the collar enlargement 18 and allows the balls to move out of the pockets in the collet. The collet is thus disconnected from the chuck body and may be withdrawn from the body. Similar movement of the collar allows the collet (and a tool) to be placed in the chuck, and release of the collar then seats the balls in the collet pockets to form a driving connection between the collet and the chuck. It will be understood that such driving connection cannot hold the collet (and the tool) rigidly in the chuck body. The amount of looseness or "play" between the chuck parts is immaterial for some metal working operations but cannot be tolerated in operations such as "spot-facing" where the play results in "chattermarks."

A sufficiently rigid holding of the collet, for any operation, may be obtained if means are provided for resiliently taking up all of the relative movement between the chuck body and the inserted collet. But such means must be usable without interfering with the "quick-changeability" of the collet in the chuck body. In Fig. 1, such means is shown as a sleeve 23 threadedly engaging one end of the collet 15 and provided with a ring 24 of resilient material resistant to oils and other materials usually present in a machine shop. The ring material is preferably of the type which may be caused to flow to a considerable extent so that the ring may be frictionally engaged with both the end of the chuck body and the side of the collet.

In the embodiment shown in Fig. 2, the end of the chuck body 5 is tapered at 27 to be engaged by a differently tapered surface 28 of a metallic sleeve 29 which is also threaded on the collet 15. In the present instance, resilience is obtained by slots 30 in the end of the sleeve at relatively small distances from one another to provide resilient fingers 31.

When the present chuck is to be used, the sleeve 23 or 29, is partially threaded on a collet 15 in which a desired tool is seated. The collar 16 is then moved axially of the chuck body 5 and is held in retracted position to allow the balls 12 to be moved outwardly (by centrifugal force if the chuck is then being rotated by a machine tool). The collet 15 is then inserted in the chuck socket 10 and the collar 16 is released, and is pressed over the balls 12 by the spring 17 to seat the balls in the collect pockets. The sleeve 23 or 29 is then threaded farther over the collet to compress the ring 24 between the chuck body and the sleeve and between the collet and sleeve as shown in Fig. 1, or to place the fingers 31 of Fig. 2 under bending stress.

It will be understood that each collet is to be provided with a sleeve and that such sleeve need be adjusted only once. Thereafter the collet-sleeve combination is as quickly and easily inserted in the chuck body as when the collect was used alone.

When the parts are assembled as shown and described, all of the "play" or slack is taken up between the chuck body and the collet. Such parts are accordingly brought into alinement which makes it easier to aline the tool with the work. The entire assembly acts as one rigid member and there no longer is any need for replacing the present collet with another type of tool holder for particular operations. Proper proportioning of the sleeve to the collets used with the chuck, avoids any interference with the "quick-changeability" of the collet in the chuck body.

Although but two embodiments of the present invention have been illustrated and described, it will be apparent that various changes and modifications may be made therein without departing from the invention as defined in the appended claims.

I claim:

1. A tool holder comprising a chuck body member, a tool-receiving collet member insertable in the body, detent means for releasably retaining the collet member in the body member and providing a driving connection between the body and the collet, and resilient means adjustably positioned on one of the members and reacting on the other member for resiliently combining the members as a substantially rigid unit, the second said means permitting withdrawal and replacement of the collet member from and in the body member without disturbing the adjustment of the second said means on the said one member.

2. A tool holder comprising a chuck body member, a tool-receiving collet member insertable in the body member, detent means for releasably retaining the collet member and providing a driving connection between the body and the collet in the body member, and a sleeve adjustably mounted on the one member for engagement with the other member whereby slack is taken up between the members.

3. A tool holder comprising a chuck body, a tool-receiving collet insertable in the body, detent means for releasably retaining the collet in the body and providing a driving connection between the body and the collet, and a sleeve threadedly engaged with the collet for movement into engagement with the body upon insertion of the collet therein and for eliminating looseness between the body and the collet.

4. A tool holder comprising a chuck body, a tool-receiving collet insertable in the body, detent means for releasably retaining the collet in the body and providing a driving connection between the body and the collet, a sleeve threadedly engaging the collet for movement into engagement with the body upon insertion of the collet therein, the sleeve being resiliently deformable upon engagement with the body for substantially rigidly positioning the collet therein.

5. A tool holder comprising a chuck body, a tool-receiving collet insertable in the body, detent means for releasably retaining the collet in the body and providing a driving connection between the body and the collet, a metallic sleeve adjustably mounted on the collet, and a resilient member mounted in the sleeve for engaging the body and the collet and providing a substantially rigid relationship therebetween.

6. A tool holder comprising a chuck body, a tool-receiving collet insertable in the body, detent means for releasably retaining the collet in the body and providing a driving connection between the body and the collet, and a metallic sleeve adjustably mounted on the collet and having an end thereof formed as resilient fingers, adjustment of the sleeve relative to the collet bringing the fingers into engagement with the body for substantially rigidly positioning the collet in the body.

EDWARD PODJASKI.

REFERENCES CITED

The following references are of record in the file of this patent:

UNITED STATES PATENTS

| Number | Name | Date |
| --- | --- | --- |
| 1,124,981 | Weaver | Jan. 12, 1915 |
| 1,252,253 | Dufresne | Jan. 1, 1918 |
| 1,377,663 | Brown et al. | May 10, 1921 |
| 1,636,421 | Knott | July 19, 1927 |
| 2,403,330 | Benton | July 2, 1946 |

FOREIGN PATENTS

| Number | Country | Date |
| --- | --- | --- |
| 1,732 | Great Britain | July 3, 1913 |
| 4,440 | Great Britain | Feb. 22, 1912 |